United States Patent
Meir et al.

[15] 3,683,818
[45] Aug. 15, 1972

[54] CAR STABILIZING CONTROL SYSTEM

[72] Inventors: Franz Meir, Herzogstandstr. 3, 8120 Weilheim; Hans Pollinger, Raenfarnstr. 65, 8 Munich 45; Bernhard Schmucker, Am Werkkanal 10, 813 Starnberg, all of Germany

[22] Filed: June 7, 1971

[21] Appl. No.: 150,658

Related U.S. Application Data

[63] Continuation-in-part of Ser. No. 798,403, Feb. 11, 1969, abandoned, and a continuation-in-part of Ser. No. 798,405, Feb. 11, 1969, abandoned.

[52] U.S. Cl. ............ 105/164, 105/197 A, 105/199 R, 105/199 A, 105/453, 280/112 A
[51] Int. Cl. .......... B60g 21/06, B61f 5/10, B61f 5/24
[58] Field of Search ..105/164, 197 A, 199 A, 199 R, 105/453; 280/6 H, 112 A, 124 F

[56] References Cited

UNITED STATES PATENTS

| | | | |
|---|---|---|---|
| 1,936,518 | 11/1933 | McColm | 172/4.5 |
| 2,135,224 | 11/1938 | Schoepf et al. | 105/164 |
| 2,417,526 | 3/1947 | Steins et al. | 105/164 |
| 2,474,471 | 6/1949 | Dolan | 105/164 |
| 3,572,747 | 3/1971 | Pollinger et al. | 105/197 B UX |

FOREIGN PATENTS OR APPLICATIONS

| | | | |
|---|---|---|---|
| 759,126 | 11/1953 | Germany | 105/164 |

*Primary Examiner*—Arthur L. La Point
*Assistant Examiner*—Howard Beltran
*Attorney*—Edmund M. Jaskiewicz

[57] ABSTRACT

A system is disclosed for controlling the air cushion suspension system of a railway vehicle so that the vehicle is tilted in the proper direction in response to following a curvilinear path. Control signals are generated from a gyroscope in response to the curvilinear movement of the vehicle. In response to these control signals signals indicating angular acceleration and angular velocity of the vehicle are generated. In response to the angular acceleration and velocity signals direction actuating signals are generated from two pair of AND circuits connected to two OR circuits with the direction actuating signals controlling the air cushion suspension to tilt the vehicle in the proper direction when travelling a curvilinear path.

19 Claims, 8 Drawing Figures

PATENTED AUG 15 1972　3,683,818

INVENTORS
FRANZ MEIR
HANS PÖLLINGER
BERNHARD SCHMÜCKER

Edmund M. Jaskiewicz
ATTORNEY

CAR STABILIZING CONTROL SYSTEM

The present application is a consolidated continuation-in-part of the copending applications Ser. Nos. 798,403 and 798405 both filed Feb. 11, 1969 now both abandoned.

The present invention relates to railway vehicles having air cushion suspension systems, more particularly, to a control system responsive to a curvilinear path followed by the vehicle to actuate the air cushion suspension system to tilt the vehicle in the proper direction.

Air cushion suspension systems having a level regulator and a curvature responsive control for the heights of the cushion bellows have already been incorporated in railway vehicles. Such a system generally comprises a compressor for pumping air from the air cushion bellows on the inside of the curve to the bellows on the outside of the curve in response to curvilinear travel of the vehicle. The compressor is generally a turbocompressor and is connected in series with the air cushion bellows on both sides of the vehicle. The compressor is driven by an electric motor whose starting, stopping and direction of rotation is controlled by contacts actuated by the swinging movement of a pendulum mounted in the vehicle. The shut-off valve is opened only while the compressor is running. The curvature responsive control mechanism comprises a pendulum mounted in the vehicle so as to swing in a plane transverse to the longitudinal direction of the vehicle. When the vehicle travels along a curve, the pendulum will swing outwardly under centrifugal force and will thus actuate contacts to start the electric motor rotating in the proper direction so that air will be pumped from the air cushion bellows on the inside of the curve to the bellows on the outside of the curve. This transfer of the air will thus decrease the height of the bellows on the inside of the curve and increase the height of the bellows on the outside. As a result of the change in height of the bellows, the vehicle body will be tilted toward the inside of the curve. The compressor will continue to deliver air to the outside bellows until either the vertical axis of the vehicle becomes parallel to the pendulum or until the maximum inclination of the vehicle body has been reached and a limit switch stops further delivery of the air.

Such a curvature responsive control device has a number of disadvantages. Since the pendulum is susceptible to swinging movement by every momentary acceleration of the vehicle produced by irregularities in the road bed or vibrations of the vehicle, it is necessary to suppress the movement of the pendulum. In order to screen out such momentary swinging movements caused by lateral vibrations of short duration it has been proposed to connect retarding members on the contacts of the pendulum to delay a signal being transmitted until after the outward swing of the pendulum continues beyond a predetermined period of time. Since with these retarding and delaying devices the compressor will not be energized until sometime after the vehicle has entered a curve, it is apparent that the tilting of the vehicle body toward the inside of the curve will be correspondingly delayed. During the elapse of time from the entry of the vehicle into the curve until the tilting begins, passengers in the vehicle will be subjected to a centrifugal force toward the outer periphery of the curve. As the vehicle leaves the curve the centrifugal force on the pendulum will decrease. However, if the tilt limiting mechanism becomes actuated before the vehicle emerges from the constant radius portion of the curve the pendulum will remain in its inclined position. Since the tilting moment exerted by the air cushions upon the vehicle body will remain constant but the centrifugal forces acting upon the vehicle body will decrease the vehicle body will tend to swing in an undesired manner toward the inside of the curve. Because of this further tilting and the subsequent decrease of the centrifugal force the pendulum, being subjected to the delayed action, will return from its outwardly swung position to its mid-position. During this movement of the pendulum, however, there will not be any return of the vehicle body to its vertical upright position. The compressor will not begin to pump air from the outside bellows to the inside bellows in response to signals from the pendulum after elapse of the delay time until after the pendulum, in response to a termination of the tilting of the vehicle body, swings outwardly in the opposite direction. As the air is pumped back into the inside bellows, and the vehicle body will be returned to its upright position. It is now apparent that the passengers who have been previously subjected to a centrifugal force toward the outside of the curbe because of the limitation on the maximum tilt of the vehicle will now be subjected to a force directed toward the inside of the curbe as a result of an increase in the tilt of the vehicle body as it leaves the curve. This change of direction in the centrifugal force produces disagreeable and uncomfortable effects in the passengers.

The above mentioned disadvantages and difficulties are inherent in curvature responsive control devices wherein a pendulum is employed to indicate the curvilinear path of the vehicle. For precise tilting of a railway vehicle having an air cushion suspension it is necessary to provide a curvature responsive device which will generate an actuating signal for tilting of the vehicle as soon as the path of the vehicle changes from a straight line to a curvilinear one. At the same time, the air cushion suspension system must receive an actuating signal which will disengage the level regulating control for the vehicle body so as to avoid any reverse tilting of the vehicle body. The signal for acutating the tilting mechanism must be stopped before the vehicle leaves the transitional portion of the curve and enters the constant radius portion because as the vehicle travels along a path of constant radius the centrifugal force will remain constant. As the vehicle proceeds from the curve onto the straight portion of the road bed the control mechanism must deliver air to the air cushion suspension system to return the vehicle body into the upright position. This acutating signal together with the signal for disengaging the level regulator of the air cushion suspension system must terminate before the vehicle leaves a transition portion of the curve to enter a straight track. In order for such a control device to be completely satisfactory in controlling the tilting of a railway vehicle, the control device must generate these actuating signals with the relationship to the curvilinear and rectinilear movement of the vehicle as described above.

Such a tilt control system can be modified so as to be independent of the air cushion suspension system by providing special cylinders actuated by compressed air or hydraulic fluid. Furthermove, actuating signals generated under these mentioned conditions may also be employed for controlling the coupling device of a railroad vehicle, a rotary support, or a running axle precisely in response to the curvature of the road bed.

It is therefore the principal object of the present invention to provide a novel and improved curve responsive device for controlling the tilting of railway vehicles provided with air cushion suspension systems.

The disadvantages of the prior art as described above are eliminated by the present invention which discloses a curve responsive control device for controlling the tilting of railway vehicles having air cushion suspension systems. The control device comprises means responsive to curvilinear movement of the railway vehicle for generating control signals. This means may by a gyroscope. There are also means responsive to the curvilinear control signals for generating signals indicating angular acceleration and angular velocity of the vehicle. Responsive to the angular acceleration and angular velocity signals there is means for generating direction actuating signals which control the air cushion suspension system to deliver air from the air suchions on one side of the vehicle to the cushions on the other side of the vehicle whereby the vehicle is tilted in the proper direction depending on the direction of curvilinear travel of the vehicle.

Signals indicating angular acceleration and angular velocity of the vehicle are generated from a measuring apparatus which produces an output signal proportional to the angular velocity of the vehicle. This output signal is fed to an amplifier which may include a transistor and a resistor. A first comparator has a first input connected to the amplifier. Also connected to the output from the measuring apparatus is a time delay circuit which may include a condensor and a resistor. A second comparator has a first input connected to the time delay circuit. Means are connected to the second inputs of both the first and second comparators for introducing a predetermined voltage into these inputs. The output of the first comparator will be an indicating signal responsive to the angular velocity of the vehicle and the output of the second comparator will be an indicating signal responsive to the angular acceleration of the vehicle.

For the forward and reverse direction of the vehicle two such measuring arrangements can be provided.

The measuring apparatus may be provided with two output lines which transmit respective output signals having mirror image amplitudes proportional to the angular velocity of the vehicle to a zero-signal. Each of these output lines may be connected over the amplifier with each of the first comparators and over a condensor with each of the second comparators.

Other objects and advantages of the present invention will be apparent from the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 3:
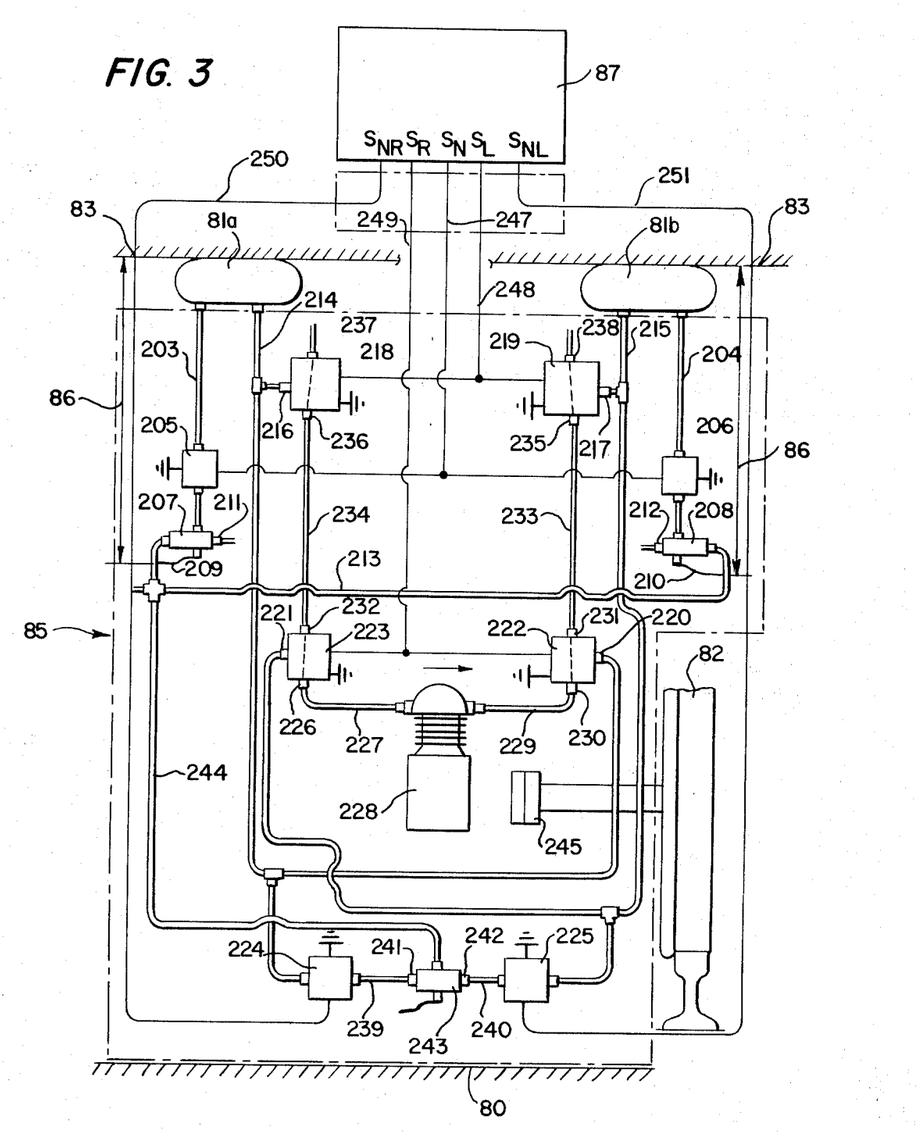
FIG. 3 is a schematic diagram of the air suspension system on the railway vehicle.

As may be seen in FIG. 3 the air suspension system for supporting the vehicle comprises air suspension cushions or bellows 81a and 81b which are positioned on opposite sides of the vehicle body 80 and are each connected by conduits 203 and 204 to magnetic controlled shut-off valves 205 and 206 and to level regulating valves 207 and 208. The valves 207 and 208 are mounted on the air-cushioned vehicle body and are acutating by levers 209 and 210 which are pivotally connected to the non-cushioned vehicle frame. The level regulating valves 207 and 208 have air outlet ports 211 and 212 and have their inlets connected by a conduit 213 to a source of compressed air not shown in the drawing. Each level regulating valve 207 and 208 controls the admission of compressed air into the air bellows 81a or 81b upon its respective side when the height of the bellows is too low. The admission of compressed air is controlled by pivotal movement of lever 209 or 210 while the respective shut-off valve 205 or 206 is open. When the level of a bellows 81a or 81b is too high with respect to the vehicle frame, the corresponding level regulating valve 207 or 208 is operated by pivoting of the corresponding lever 209 or 210 to permit compressed air to escape into the atmosphere through the corresponding outlet 211 or 212. Shut-off valves 205 and 206 will remain open. The level regulating valves 207 and 208 therefore act to maintain the heights of the air suspension bellows 81a and 81b constant.

The suspension bellows 81a and 81b are also connected through tubular conduits 214 and 215 with branch connections 216 and 217 to magnetic two-way valves 218 and 219. Conduit 214 also connects to inlet 220 of a magnetic two-way valve 222 and conduit 215 connects to inlet 221 of a magnetic two-way valve 223. Conduit 214 is also connected to a magnetic shut-off valve 224 and conduit 215 connected to a magnetic shut-off valve 225.

The two-way valve 223 has an inlet 226 which is connected to the intake conduit 227 of an air compressor 228. The compressor 228 is provided with a discharge conduit 229 leading to an inlet 230 of the two-way valve 222. The outlet connections 231 and 232 of the two-way valves 222 and 223 are connected by conduits 233 and 234 with the inlet connections 235 and 236 of the two-way valves 219 and 218 respectively. The two-way valves 218 and 219 are also provided with outlets 237 and 238 which open to the atmosphere.

Shut-off valves 224 and 225 are provided with connecting conduits 239 and 240 which lead to regulating connections 241 and 242 of a third level regulating valve 243. The connections 241 and 242 can be pneumatically connected to each other through the level regulating valve 243.

The level regulating valve 243 is positioned in the contral longitudinal plane of the vehicle so as to be responsive only to changes of elevation of the longitudinal tilting axis of the vehicle body but not by any tilting movements of the body about this longitudinal axis.

The air bellows used in supporting vehicle bodies often have the characteristic of having a volume which varies in a non-linear relationship to the height of the bellows. Further, during actuation of the control system it is sometimes necessary to fill previously emptied air conduits by compressed air from a bellows. In addition, the compressor does not deliver all of the air that it is supposed to deliver because of the leakage of compressed air through its housing. Because of these reasons when the control apparatus is responsive to a curvilinear path there will be a variation in elevation of the axis about which the vehicle body is tilted by the bellows on its two sides. In order to avoid this undesirable change in the height of the bellows, the third level regulator is provided in the system of the present invention. This third level regulator is controlled by the level of the longitudinal axis of tilt of the vehicle body and functions to control the pressure in only those bellows which are on the outside of the curved path followed by the vehicle.

It is preferable that this third level regulating valve comprise a level regulator whose outlet is connected to the bellows on both sides of the vehicle through shut-off valves responsive to the curvilinear path of the vehicle.

The level regulating valve 243 is connected to a source of compressed air through a conduit 244.

The compressor 228 is driven through a speed responsive clutch 245 connected to the axle upon which is mounted a railway wheel 82. By driving the compressor from an axle of the vehicle it is possible to control the response and functioning of the curve responsive control with respect to the speed of the vehicle. This in turn results in obtaining an increase in the function as vehicle speed increases. The output of the compressor is then proportional to the speed of travel of the vehicle within a wide range. The tilting and the return to an upright position of the vehicle body will then be dependent on the speed of the vehicle as desired in the present invention.

The clutch coupling 245 is controlled by the speed of the vehicle in such a manner that ordinarily the clutch will remain disengaged but will be engaged automatically whenever the vehicle speed exceeds a predetermined value. This arrangement functions to save the compressor from operation during slow vehicle speeds when the compressor is not needed.

The solenoid coils of the magnetic shut-off valves 205 and 206 are both connected to an electrical control lead 247. In a similar manner, the solenoid coils of the magnetic valves 218 and 219 are connected to control lead 248 and the solenoid coils of the two-way valves 222 and 223 are connected jointly to an electrical control lead 249. The solenoid coils of shut-off valves 224 and 225 are energized separately through the electrical leads 250 and 251 respectively. All of the two-way valves 218, 219, 222, and 223 while at rest in their normal position have their inlet connections 236, 235, 230 and 226 connected to their respective outlets 237, 238, 231 and 232. At rest, the shut-off valves 205 and 206 remain open whereas shut-off valves 224 and 225 remain closed while at rest.

Figure 4:
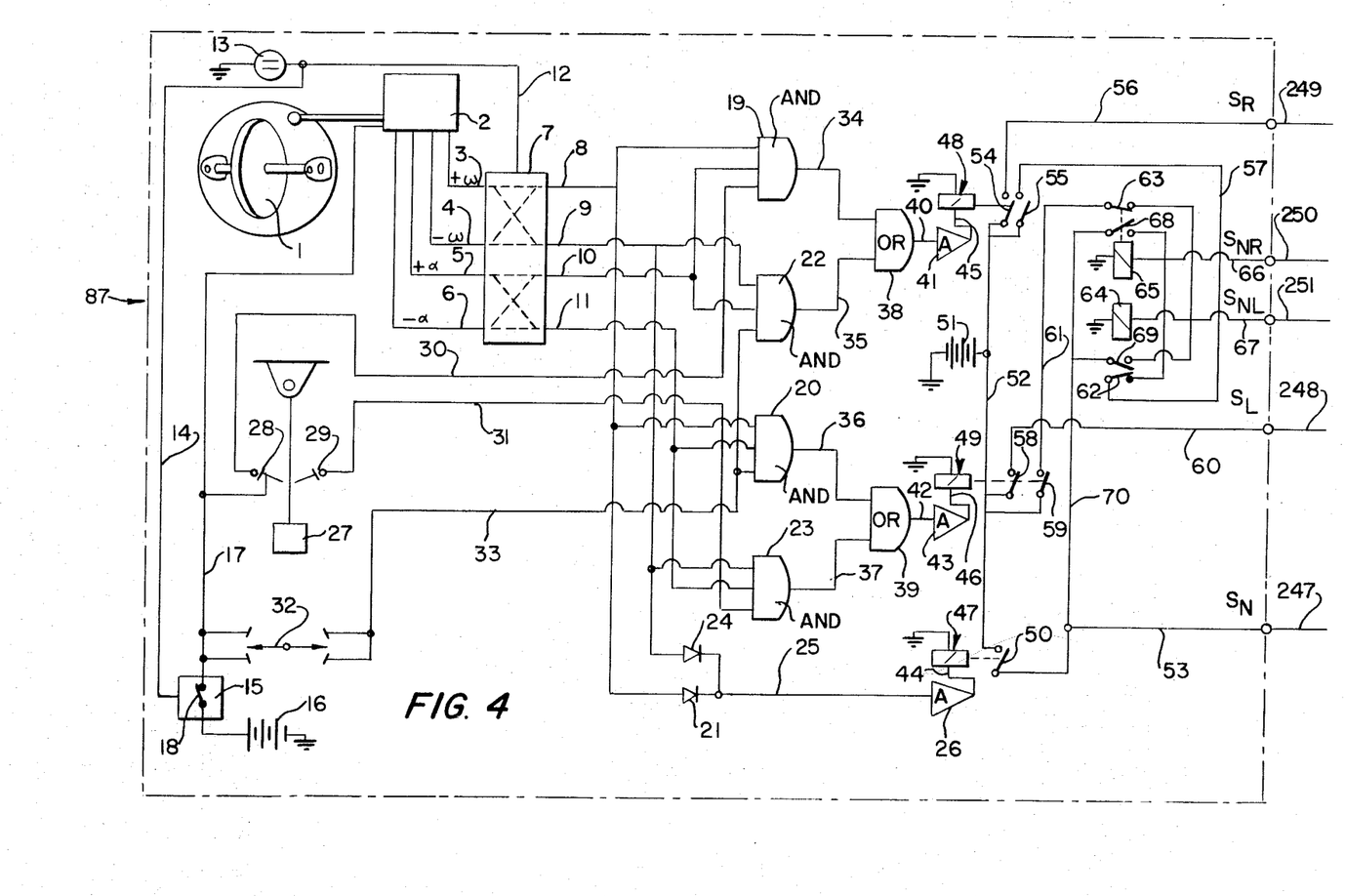
FIG. 4 is a schematic representation of the control system according to the present invention.

The several electrical control leads 247, 248, 249, 250 and 251 lead to a control device 87 which is illustrated in FIG. 4 and whose operation will be described in detail. The control device 87 is responsive to turning movements or angular acceleration of the vehicle about a vertical axis, or may be made responsive to the inclination or tilting of the vehicle body. The control device may also include devices known in the art which are responsive to signal generators positioned along the tracks of railway vehicles. The control device 87 controls the connecting of control leads 247 to 251 to a voltage source.

The control apparatus 87 has the characteristic that when the angular velocity of the vehicle attains the value $\omega$ the control lead 247 (see FIG. 3) will remain connected to a source of electrical voltage during the duration of this velocity. In addition, control device 87 will connect control leads 250 or 251 to the voltage source depending on the direction in which the vehicle is turning. Assuming that bellows 81a as viewed in the direction of travel of the vehicle is on the left side and bellows 81b on the right side of the vehicle, the control device 87 in a right curve will connect control lead 250 and in a left curve the control lead 251 with the voltage source. As the vehicle travels along the route A indicated in FIG. 6, the control apparatus 87 will transmit control signals $S_N$ (indicated in row D in FIG. 6) to control lead 247 and to one of the control leads 250 or 251. As the vehicle begins to be subjected to angular acceleration $\alpha$ the control device 87 at the same time connects either control lead 248 or 249 (depending on the direction of travel of the vehicle) with the voltage source. Under the above described conditions, control device 87 will connect the voltage source with control lead 249 as the vehicle enters a right hand curve and with control lead 248 as the vehicle leaves a right hand curve, but with control lead 248 as the vehicle enters a left hand curve and with control lead 249 as the vehicle leaves a left hand curve. The connecting of these control leads in this manner generates the commands signals for tilting the vehicle body to the right or to the left. In row D of FIG. 6, the control signals for tilting the vehicle body to the right are represented at $S_R$ and for tilting the vehicle body to the left at $S_L$. During movement of the vehicle in the opposite direction as indicated by the dash lines in row D, the control device 252 will transpose or reverse the right and left tilting commands as indicated.

In the system as illustrated in FIG. 3, the control leads 247 to 251 are all disconnected from the voltage source when the vehicle travels along a straight path. The two-way valves 218, 223, 222, and 219 therefore connect the intake 227 and the discharge 229 of compressor 228 with the atmosphere at outlets 237 and 238. Shut-off valves 205 and 206 are open and shut-off valves 224 and 225 are closed. The pressure within the bellows 81a and 81b is therefore controlled only by the level regulating valves 207 and 208. The level regulating valve 243 is inoperative at this time.

When the vehicle and the compressor 228 driven by the vehicle axle moves into a right turn, the control device 252 will connect control leads 247, 249 and 250 with the voltage source. This will close shut-off valves 205 and 206, switch over two-way valves 222 and 223 and open shut-off valve 224. The level regulator valves 207 and 208 will thus be disconnected from the respective bellows 81a and 81b and the compressor 228 begins without any significant delay to pump air from bellows 202 through conduit 215, two-way valve 223 and intake conduit 227 and will pump the air through discharge conduit 229, two-way valve 222 and tubular conduit 214 to bellows 81a. Accordingly, the height of bellows 81b will decrease while the height of bellows 81a increases to tilt the vehicle body to the right.

As the vehicle body reaches the angle of maximum tilt or the angular acceleration becomes zero, the control device will again disconnect lead 249 from the voltage source. This will have the effect of stopping the pumping of air from bellows 81b to bellows 81a because the intake and discharge conduits 227 and 229 will now be open to the atmosphere. The existing tilted or inclined condition of the vehicle body will be retained.

As a result of the non-linear changes of volume of bellows 81a and 81b and the filling of the previously empty conduits with compressed air and leakage losses in compressor 228, there will generally be a lowering vertically of the longitudinal tilt axis of the vehicle body during the above described tilting operation. The lowering of the longitudinal tilt axis will open level regulating shut-off valve 243 to feed compressed air from supply conduit 244 into the conduits 239 and 240. Shut-off valve 224 which has now been opened will then deliver compressed air from conduit 239 through conduit 214 to bellows 81a until the longitudinal axis of tilt of the vehicle body has been raised up to its original level. When this level is reached valve 243 will close. During the travel of the vehicle through the constant radius portion of a right hand curve, shut-off valves 205 and 206 will remain closed while shut-off valve 224 remains open.

As the vehicle comes out of the right hand curve, control device 87 will immediately connect control lead 248 with the voltage source in response to an angular acceleration which was present in the opposite direction when the vehicle entered the right hand turn. The control leads 247 and 250 will remain connected with the voltage source. Two-way valves 218 and 219 however, will be switched over to connect bellows 81a and 81b through conduits 214 or 215 and 234 or 233 and two-way valves 223 with the intake conduit 227 or the discharge conduit 229 of compressor 228. The compressor 228 will now pump air from bellows 81a to bellows 81b. This action will return the vehicle to its upright vertical position. As soon as the angular acceleration experienced during the transition from the curvilinear to the rectilinear path has disappeared, the control device will disconnect control leads 247, 248 and 250 from the voltage source. The initial conditions will now be re-established and the level control of the vehicle is now effected through the reopened shut-off valves 205 and 206 under the action of level regulating valves 207 and 208. The closing of shut-off valve 224 will render the level regulating valve 243 ineffective.

As the vehicle enters a left turn, the control device 87 will respond to an angular acceleration $\alpha$ and will connect the control leads 247, 248 and 251 with the voltage source. The two-way valves 218 and 219 will now be switched over to connect the intake conduit 227 with bellows 81a and the discharge conduit 229 with the bellows 81b. Compressor 228 will now pump air from bellows 81a into bellows 81b to tilt the vehicle body to the left. At the same time, shut-off valves 205 and 206 are closed and shut-off valve 225 is opened. As soon as the vehicle passes through the transition from rectilinear to curvilinear movement and enters the constant radius portion of the turn with maximum tilt of the vehicle body, the control device 87 will disconnect control lead 248 from the voltage source. The two-way valves 218 and 219 will now be switched to interrupt the flow of air from bellows 81a to bellows 81b.

If there has been any lowering of the horizontal longitudinal axis of tilt of the vehicle body, the level regulating valve 243 will be opened to deliver compressed air from conduit 244, through conduit 240, open shut-off valve 225, and conduit 244, through conduit 240, open shut-off valve 225, and conduit 215 to bellows 81b until the longitudinal axis is raised to its requisite height. The level regulating valve 207 and 208 will remain inoperative during the time that the shut-off valves 205 and 206 are closed.

If the vehicle is subjected to any angular acceleration as the vehicle leaves the left curve, the control device 87 will connect lead 249 to the voltage source to switch over the two-way valves 222 and 223. The compressor will now pump the air from bellows 81b through conduit 215, two-way valve 223, intake conduit 227, discharge conduit 229, two-way valve 222, and tubular conduit 214 to bellows 81a. This pumping will continue until the vehicle body returns to its vertical upright position or the vehicle has entered a straight portion of the path and the control device 87 thus disconnects control leads 247, 249 and 251 from the voltage source so as to return this system to its original condition.

The capacity of the compressor 228 is such that at different driving speeds and thus at different travel speeds of the vehicle, the compressor will always be able to deliver the necessary quantity of air from one of the bellows to the other bellows to tilt properly the vehicle body as the vehicle travels around a curve.

In FIG. 4 there is illustrated the control device 87 which comprises an enclosed gyroscope 1 mounted in the vehicle 80 with its measuring axis being vertical and its axis of rotation being horizontal and transversely of the longitudinal axis of the vehicle. The gyroscope is connected to a measuring device 2 which generates two different signals $+\omega$ and $-\omega$ in response to the turning movements of the vehicle about its vertical axis as indicated by the gyroscope 1. Measuring device 2 also generates angular acceleration signals $+\alpha$ and $-\alpha$ in response to the control signals generated from the gyroscope. The gyroscope 1 and measuring instrument may be those manufactured by Teldix of Heidelberg, West Germany.

Figure 2:
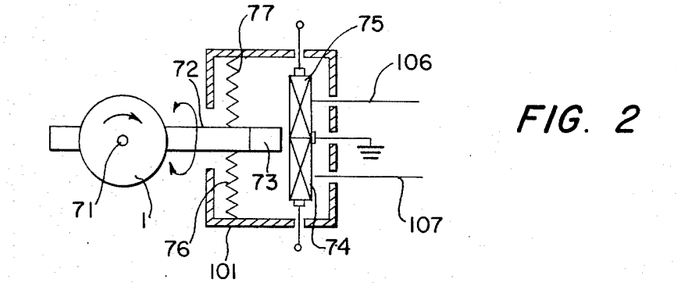
FIG. 2 and 2a are schematic representations of mechanical and electrical measuring devices, respectively, for the generation of signals responsive to the gyroscope.
Figures 2A, 4A:
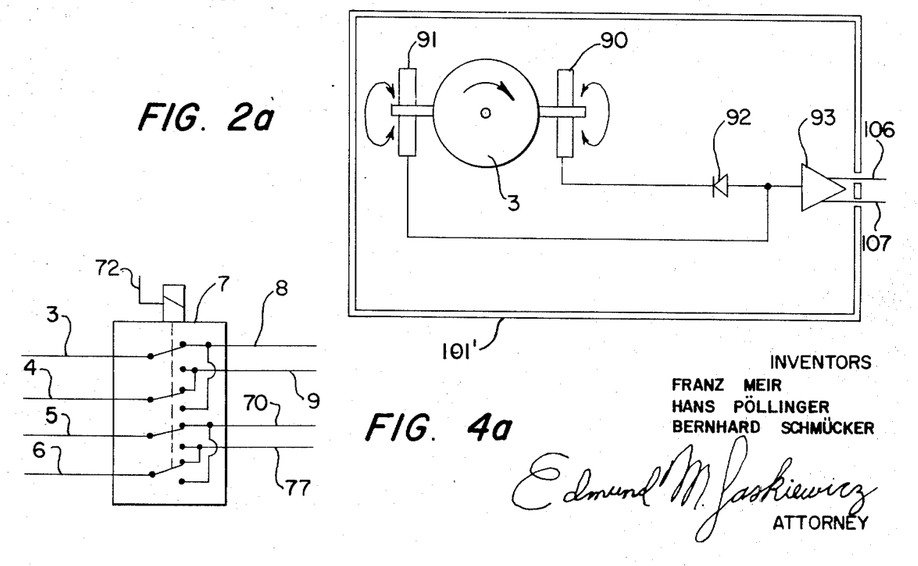
FIG. 4a is an electrical circuit diagram showing the connections within the switching device of FIG. 4.
Figure 5:
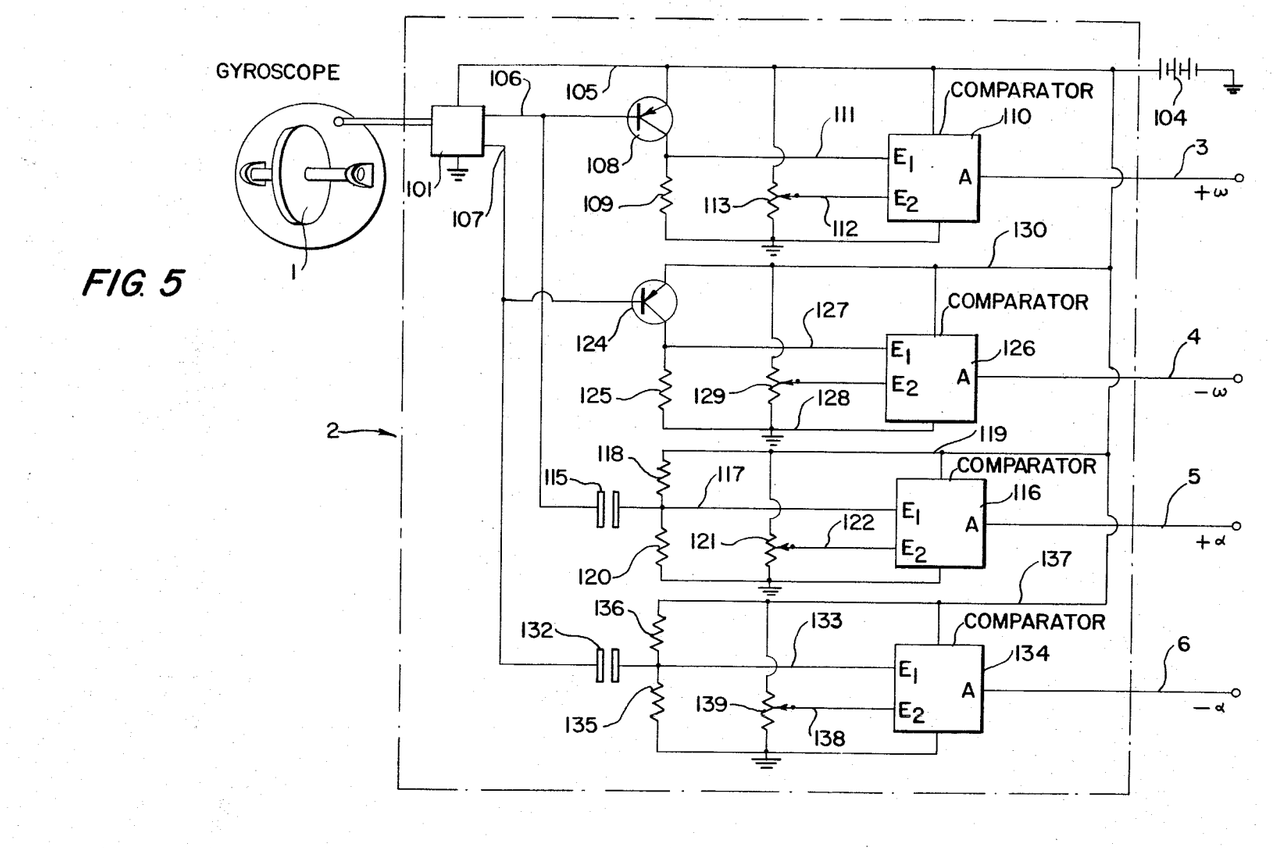
FIG. 5 is a schematic representation of the control device of the present invention.

The signals from measuring device 2 shown in detail in FIG. 5 indicating angular acceleration and angular velocity or turning movement are transmitted by conductors 3, 4, 5 and 6 to a switching device 7 which has two switching positions and is shown in greater detail in FIG. 4a. In one switching position, the signals $+\omega$, $-\omega$, $+\alpha$ and $-\alpha$ are transmitted to conductors 8, 9, 10 and 11 respectively. In the second switching position, conductors 3 and 4 which transmit signals $+\omega$ and $-\omega$ are transposed to transmit these signals to the conductors 9 and 8 respectively. In a similar manner, in the second switching position the switching device 7 transposes the connections of conductors 5 and 6 to conductors 11 and 10 respectively. The switching device 7 is controlled through conductor 12 by the polarity of a voltage generated by a D.C. generator 13 which is driven in a known manner by an axle or wheel of the vehicle. When the vehicle travels in the forward direction, switching device 7 will be in the first switching position but upon reverse movement of the vehicle the switching device will be transposed into its second switching position.

There is an electrical lead 14 branching off from the conductor 12 to a switching device 15 which, independently of the polarity of the generated voltage, closes a switch 18 between a constant voltage source 16 and a voltage supply conductor 17 whenever the voltage in lead 14 exceeds a predetermined value independently of the polarity. Since the voltage in lead 14 depends on the r.p.m. of the D.C. generator 13, switch 18 will close only after the speed of the vehicle exceeds a certain minimum velocity. The measuring device 2 is supplied with electrical energy from the conductor 17.

The output conductor 8 of switching device 7 is connected to the input of an AND circuit 19, of another AND circuit 20 and to a diode 21. The output conductor 9 from switching device 7 is connected to the input of an AND circuit 22, of a second AND circuit 23 and to a diode 24. Output conductor 10 is connected to a second input of the AND circuit 19 and to a second input of AND circuit 22. Output conductor 11 is connected to the second inputs of AND circuits 20 and 23. The diodes 21 and 24 are connected to a common conductor 25 leading to the input of a signal amplifier 26.

Mounted within the vehicle is a pendulum 27 which swings in a vertical plane transverse to the longitudinal axis or direction of travel of the vehicle. Contacts 28 and 29 are closed when engaged by the outwardly swinging pendulum. Contact 28 is closed by centrifugal force during forward movement of the vehicle along a right turn and is connected between the voltage supply conductor 17 and a conductor 30 connected to a third input of the AND circuit 19. Contact 29 which is closed during forward movement of the vehicle along a left turn curve connects the voltage supply conductor 17 with a lead 31 connected to the third input of the AND circuit 23. The pendulum functions to prevent overcontrolling while the vehicle travels along paths that are only slightly curved. When the contacts are closed by the swinging pendulum, actuating signals will be generated in response to similarly directed angular acceleration and angular velocity signals only after the pendulum has swung out in the opposite direction.

It is also desirable to prevent overcontrolling while the vehicle leaves a curved portion of the road to enter a straight portion. For this purpose a central switch 32 is provided which is responsive to the angle between the plane of the railway track and the vertical longitudinal plane of the vehicle. The switch is provided with contacts for interrupting the production of actuating signals when angular acceleration and angular velocity signals are not in the same direction during that time that the angle between the plane of the railway track and the vertical longitudinal plane of the vehicle is at a right angle. In its open position switch 32 breaks the connection of voltage supply 17 with lead 33 connected to the third inputs of the AND circuits 20 and 22 only during travel along a level road where the cushioned portion of the vehicle body is parallel to the wheel axles.

The AND circuits 19, 20, 22 and 23 have the characteristic of transmitting a voltage signal to their respective outputs 34, 35, 36 and 37 only when a signal voltage reaches all of the input terminals simultaneously. The outputs 34 and 35 of AND circuits 19 and 22 are connected to the inputs of an OR circuit 38, while the outputs 36 and 37 of the two AND circuits 20 and 23 are connected to the inputs of an OR circuit 39. The OR circuits 38 and 39 have the characteristic of transmitting a signal to their respective outputs 40 and 42 only when a signal is received by one or both of their respective inputs. The output 40 of the OR circuit 38 is connected with the input of a signal amplifier 41 and the output 42 of the OR circuit 39 is connected with the input of a signal amplifier 43. When one of the amplifiers 26, 41 or 43 receives a signal, the signal will be transmitted from its respective output 44, 45 or 46 to the coil of its respective relay 47, 48 or 49. The relay 47 which is connected to the signal amplifier 26 closes a switch 50 when energized which in turn closes the connection of lead 52 from an electric power source 51 to a conductor 53 which delivers an actuating signal $S_N$. This actuating signal is delivered only when the vehicle is turning about its vertical axis but this signal is independent of the direction of the turn. In an air cushion suspension system having a tilt control system for the vehicle body, the actuating signal $S_N$ can be used for disconnecting the generally used level regulating means.

Relay 48 when non-energized maintains switches 54 and 55 open. Switch 54 connects lead 52 with a lead 56 for transmitting an actuating signal $S_R$ only while the vehicle is moving with an angular acceleration about a vertical axis in a predetermined direction which may be to the right. Relay switch 55 provides a connection of lead 52 with a lead 57. The relay 49 is connected to two switches 58 and 59 which are closed only when relay 49 is energized. The relay switch 58 connects lead 52 with an output conductor 60 which transmits an actuating signal $S_L$ only during movement of the vehicle with angular acceleration about a vertical axis in a direction opposite to the direction set forth above or to the left. In the above described known air cushion suspension system, the actuating signals $S_R$ and $S_L$ are transmitted to devices which will tilt the vehicle body in one direction during the continued transmission of one of such signals but will tilt the body in the other direction during the continued transmission of the other of such signals.

The relay switch 59 connects lead 52 with a conductor 61. The conductors 57 and 61 lead to contacts 62 and 63 of relays 64 and 65 respectively with these contacts being closed when the relays are non-energized. Contact 62 is connected to an output lead 66 for an actuating signal $S_{NL}$. From contact 63 there is an output conductor 67 delivering an actuating signal $S_{NL}$. The output 66 is also connected to the coil of relay 65 with the other end of the coil being connected to ground and also connected a contact 68 which remains open while relay 65 is non-energized. Output 67 is connected in a similar manner to the coil of relay 64 with the other end of the coil being connected to ground and to a contact 69 which remains open while the relay 64 is non-energized. Contacts 68 and 69 have their other sides connected to a conductor 70 leading to output 53.

In the known air cushion suspension system, while an actuating signal $S_{NR}$ or $S_{NL}$ is generated, the air cushion which at that time is on the outside of the curve is connected to a level regulator which is controlled only by the height of the longitudinal tilt axis of the vehicle.

The electrical energy supply connections to the AND circuits 19, 20, 22 and 23, the OR circuits 38 and 39 and the signal amplifiers 26, 41 and 43 are not shown in FIG. 4, but the necessary connections can be readily made through leads 17 with voltage source 16.

Figure 1:
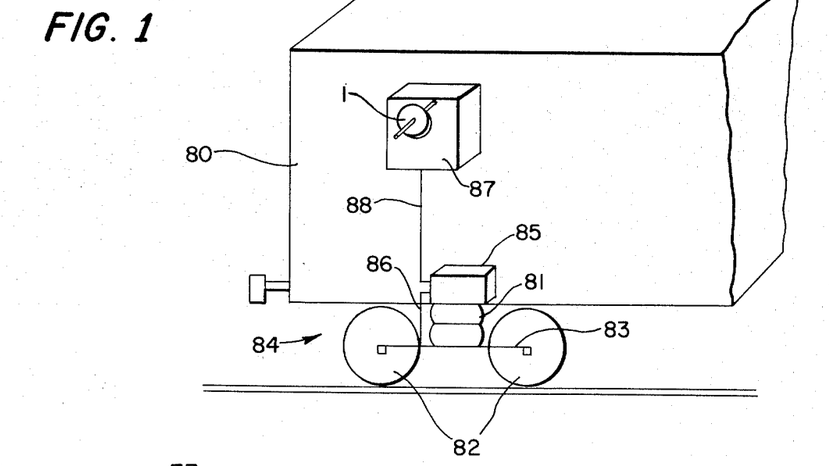
FIG. 1 is a schematic representation in perspective of one end of a railway vehicle provided with an air cushion suspension system and illustrating the locations of the gyroscope and other elements of the present invention.

As may be seen in FIGS. 1 and 3 a railway car has a body 80 supported upon air cushions 81 which are located under both sides of the body and are supported on a beam 83 of a pivotably mounted truck 84 having wheels 82. The beam 83 is connected without any springs to the wheel 82 as indicated in the drawings. Positioned in the vicinity of the air bellows 81 on the car body 80 is a control device 85 comprising a system of pressure observation and control in the bellows 81 and as shown in U. S. Pat. No. 3,572,747 issued on Mar. 30, 1971 to the same assignee as the present application. A compressor 28 shown in FIG. 1 of the above mentioned patent can also be positioned in the control device 85 which can be driven by the wheel 82 in combination with a universal joint shaft such as in known accessory drives. For actuating valves 7, 8 and 43 shown in FIG. 1 of that patent control rods 86 are employed and are positioned with respect to the beam 83 as shown in FIG. 1 of the drawings. The central switch 32 in the present application may be positioned in the control device 85 so as to be actuated by the control rods 86. All of the remaining elements illustrated in FIG. 4 can then be combined in a single device 87 positioned at any point within the vehicle body 80.

It is preferable to arrange the device 87 as near as possible to the horizontal longitudinal axis of the body. The device 87 is connected with control device 85 by a cable 88 which accomodates the output circuits 56, 66, 67, 60 and 53 for the actuating signals as well as the connecting leads 17 and 33 for central switch 32.

In FIG. 5 there is shown in greater detail the measuring device 2 which is connected to the gyroscope 1 in the vehicle 80 as shown in FIG. 4 to generate the angular velocity signals and the angular acceleration signals in response to the control signals generated from the gyroscope.

A voltage source 104 has one side connected to ground and the other side connected through lead 105 to a device 101 to connect the device to a source of electrical energy. The device 101 is provided with output lines 106 and 107. The gyroscope 1 senses rotational movement of the vehicle about a vertical axis to control the apparatus 101 so that output lines 106 and 107 produce output signals proportional to the angular velocity of the vehicle 80 with these signals having mirror image amplitudes.

The gyroscope as used with either the mechanical gyroscope measuring device of FIG. 2 or the electrical gyroscope measuring device of FIG. 2a has its gimbal frame fixed to the frame of the railway vehicle 80. The gyroscope axis 71 is positioned parallel to a horizontal transverse axis of the vehicle with the gimbal axis running perpendicular to the gyroscope axis and passing through its center point. The movement of the vehicle about its vertical axis will cause the gyroscope to deliver to its gimbal frame a moment proportional to the angular speed. If the gimbal axis is mechanically or electrically restrained in its zero or neutral position the reaction force delivered by the gimbal frame will be proportional to the angular speed of the vehicle.

The gyroscope in FIG. 2 is provided with a rod 72 whose axis coincides with the axis of the gimbal frame. A magnet 73 is positioned on the free end of the rod 72 so as to be moveable with respect to Hall generators 74 and 75 positioned in the housing of the measuring apparatus 101. Springs 76 and 77 which are secured within the housing act upon opposite sides of the rod 72 to maintain the rod in its zero position. The rotation of the vehicle about its vertical axis acting upon the gyroscope will cause the rod to swing out more or less in the drawing according to upward or lower downward movement from its neutral position. The Hall generators are connected to positive and negative terminals of a source of electricity. Any variation of the position of the magnet with respect to the Hall generators which are contiguous in a plane through the neutral position of the rod will cause a current to be indicated in one of the Hall generators which corresponds to the change in position of the magnetic body. This change will be proportional to the angular velocity of the vehicle. Accordingly, there will be generated from generator 75 a signal in output 106 which is responsive to the rotary movement of the vehicle about its vertical axis in one direction, such as to the right. In a similar manner, an output signal will be generated from the generator 74 in the output 107 responsive to the rotary movement of the vehicle about its vertical axis in the other direction, for example, to the left.

In the electrical gyroscope illustrated in FIG. 2a the gimbal axis of the gyroscope is provided with a signal generator 90 responsive to angular motion and a servo motor 91 is connected with the signal transmitter in an automatic control system. The gyroscope delivers to the gimbal axis a moment proportional to the angular velocity of the vehicle from the rotation of the vehicle about its vertical axis to cause the signal transmitter 90 to be deflected from its zero position. As a result, an electrical indicator signal is transmitted on the output of the transmitter 90 which in amplitude and phase corresponds to the degree and direction of deflection of the gimbal axis. The signal of the angular signal transmitter is amplified and delivered to a diode 92 which undertakes a phase sensitive rectification of the signal so that a voltage potential is superimposed on the servo motor which produces an opposing moment to in an effort to maintain the gyroscope in its zero position. The voltage potential is then transmitted to an amplifier 93 in which in addition to the amplification of the signal there is performed a conversion to an in phase voltage. The signal is then delivered over a connected impedance transformer, which is not illustrated in the drawings, to one or the other outputs 106 or 107 corresponding to the right or left rotation with the output signal corresponding in its magnitude to the angular velocity of the vehicle acting upon the gyroscope.

Output line 106 leads to an amplifier constructed as an emitter-follower of a transistor 108 and a resistor 109 and then through line 111 to an input $E_1$ of a comparator 110. The emitter-follower 108, 109 and the comparator 110 are connected to a source of electrical energy through line 105. The comparator 110 has a second input $E_2$ which is connected through lead 112 to a potentiometer 113 one side of which is connected to energy line 105 and the other side connected to ground. Comparator 110 has an output A from which extends an output line 3 which transmits an indicating signal $+\omega$ which will occur only from rotational movement of the vehicle around a vertical axis, for example, during rotational or angular movement to the right.

The output 106 also is connected to a condensor 115 the other side of which is connected through lead 117 to an input $E_1$ of a second comparator 116. Lead 117 is also connected through a resistor 118 with line 119 to the energy lead 115 and through a resistor 120 to ground. A potentiometer 121 is connected between the lead 119 and ground and also through lead 122 to the second input $E_2$ of the comparator 116. Comparator 116 is energized through lead 119 which is connected to energy lead 105. Comparator 116 has an output A from which extends lead 5 to transmit an indicating signal $+\alpha$. The signal $+\alpha$ will occur when the vehicle is subjected to an angular acceleration while moving in the direction corresponding to the generation of the $+\omega$ signal.

The output line 107 is connected similarly to output line 106 to a transistor 124 and a resistor 125 connected as an emitter-follower to function as an amplifier. Line 127 then connects from the amplifier to input $E_1$ of a corresponding first comparator 126. The second input $E_2$ of comparator 126 is connected to the movable terminal of a potentiometer 129 one end of which is connected to a lead 130, together with transistor 124 and comparator 126, to the energy lead 105. The other side of potentiometer 129 is connected to ground. The output A of comparator 126 transmits over output lead 4 an indicating signal $-\omega$ which occurs only when the vehicle is proceeding around a curvilinear path about a vertical axis in a direction opposite to that generating the indicating signal $+\omega$.

In a similar manner, output line 107 is further connected with the input $E_1$ of a comparator 134 through a condensor 132 through lead 133. The lead 133 has connected to it a resistor 136 which in turn is connected through a branch lead 137 to the energy lead 105. Also, a resistor 135 is connected to lead 133 and to ground so that the condensor 132 and resistor 135 constitute a time delay circuit.

Comparator 134 has a second input $E_2$ which is connected through lead 138 to the movable terminal of a potentiometer 139 connected between branch lead 137 and ground. Comparator 134 has an output A to which is connected output lead 6 over which is transmitted an indicating signal $-\alpha$. The indicating signal $-\alpha$ is generated only when the vehicle is subjected to an angular acceleration and moving in the same direction which gives rise to the indicating signal $-\omega$.

The comparators 110, 116, 126 and 134 have the characteristic of producing an output signal at their outputs A only when the voltage at input $E_1$ is at least equal to or greater than the voltage at the input $E_2$. The potentiometer 113 will thus introduce a constant voltage to the input $E_2$ of comparator 110 which will exceed by a small amount the prevailing voltage in lead 111 when the vehicle is not subjected to any rotational movement and there is a zero signal in output line 106. Under the same conditions where there is no rotary movement of the vehicle the potentiometer 129 will introduce a voltage to input $E_2$ of comparator 126 which is less than the voltage at $E_1$ of comparator 126 by about the amount of the voltage difference in leads 111 and 112. In a corresponding manner, a voltage will be introduced at input $E_2$ of comparator 116 by potentiometer 121 which will exceed by a definite value the total of the voltages resulting from resistors 118 and 120 and introduced at input $E_1$. In a like manner, the voltage introduced at input $E_2$ of comparator 134 by potentiometer 139 will exceed by a fixed amount the voltage introduced through lead 133 to input $E_1$.

OPERATION OF THE CONTROL SYSTEM

In the resting condition where there is no rotational movement by the vehicle around a vertical axis and the apparatus 101 generates in the output line 106 and 107 a zero signal there will be a voltage at the respective inputs $E_2$ of the comparators 110, 116, 126 and 134 which will exceed by a definite value the voltage at the respective inputs $E_1$. As a result, no indicating signals will be generated in the outputs 3, 4, 5 and 6 of the respective comparators.

As the vehicle proceeds along a curvilinear path so that the vehicle is subjected to a rotational movement about a vertical axis, the gyroscope 1 will sense this movement and transmit signals to the device 101 which in turn will transmit over output lines 106 and 107 output signals having amplitudes opposite to each other to correspond to the direction of turning of the vehicle. It may be assumed that the output signal increases the prevailing voltage in output line 106 and decreases the prevailing voltage in output line 107. These voltage changes will effect corresponding voltage changes in lines 117 and 133 through the condensors 115 and 132 respectively with the degree of these changes depending on the speed of the voltage changes in the output lines 106 and 107. Accordingly, a voltage increase will occur at input $E_1$ of comparator 116 and a voltage decrease will occur at input $E_2$ of comparator 134. For this reason, the comparator 134 will remain in the resting state while the comparator 116 generates in its output line 5 an indicating signal $+\alpha$ as soon as the voltage at its input $E_1$ exceeds the voltage being introduced at its input $E_2$. Simultaneously with these operations the voltage increase in the output line 106 will exceed a threshold voltage and will carry over through transistor 108 to lead 111 to input $E_1$ of comparator 110. As soon as the input voltage at input $E_1$ of comparator 10 becomes equal to the standing voltage at input $E_2$, the comparator 110 will generate in its output line 3 an indicating signal $+\omega$. The comparator 126 remains inoperative. When the vehicle enters a curve or passes through a curved section having a decreasing radius of curvature and the angular acceleration and angular movement of the vehicle are in the same direction then under these circumstances indicating signals $+\omega$ and $+\alpha$ will be generated.

As soon as the vehicle enters a curved section having a constant radius of curvature its angular velocity will remain constant. In a like manner measuring device 101 will maintain the signals in output lines 106 and 107 constant. The voltage in lead 117 and thus at input $E_1$ of comparator 116 will return to the value of the voltage components as established by resistors 118 and 120 and input voltage at $E_1$ will be less than the input voltage at $E_2$. When this occurs, the indicating signal $+\alpha$ in output 5 will no longer be generated. However, the indicating signal $+\omega$ in output 3 will continue. The prevailing voltage in lead 133 will be returned through the resistors 135 and 136 to its output value.

As the vehicle passes through the exit portion of the curve after leaving the constant curvature portion and to enter a straight portion of the track, its angular velocity will decrease and the gyroscope 1 will reduce the signal introduced into output lines 106 and 107 and will return to the zero signal. As a result, the voltage will decrease in output line 7. The voltage increase in output line 107 produces a corresponding voltage increase in lead 133 and to input $E_1$ of comparator 134. When the voltage at input $E_1$ equals the prevailing voltage at input $E_2$ comparator 134 will generate in its output line 6 an indicating signal $-\alpha$. Thus when the vehicle is passing through the exit curve portion to enter a straight stretch of track indicating signals $+\omega$ and $-\alpha$ will be generated.

As the vehicle enters the straight portion of its path its rotational or angular movement will cease and the measuring device 101 will again send the zero signal in output lines 106 and 107. As a result of the zero signal the voltage at input $E_1$ of comparator 110 decreases below the standing voltage at input $E_2$ of the same comparator and the comparator 110 thereby ceases generation of the indicating signal $+\omega$ in its output line 114. Since at the same time the voltage ceases to increase in output line 107, the input voltage in lead 133 to comparator 134 will decrease below the value of the voltage established by resistors 135 and 136. Thus, at comparator 134, the input voltage at $E_1$ will be less than the input voltage at $E_2$ and output signal $-\alpha$ will no longer be generated in output line 6. The system is thus returned to its original condition.

In the case where the vehicle passes through a curve having a curvature opposite to that of the curve described above, the measuring device 101 will transmit a voltage increase in its output line 107 and a corresponding voltage decrease into its output line 106. In the manner as described above, comparator 126 will be actuated to generate an indicating signal $-\omega$ in its output line 131 and the comparator 134 actuated to generate an indicating signal $-\alpha$ in its output line 6 as the vehicle leaves a straight section and enters a transition curve portion curved in the opposite direction. As the vehicle leaves the transition curve and enters a constant radius curved portion the voltage in output line 107 will remain the same but the indicating signal $-\alpha$ will be terminated because of the input voltage $E_1$ of comparator 134 decreasing below the value established by resistors 135 and 136. When the vehicle enters the exit transition curve voltage in output line 107 will be decreased and the voltage in output line 106 will be increased until both voltages return to their condition existing when the vehicle enters the transition curve from a straight section. A zero signal is thus produced. In the exit transition curve, the voltage increase in output line 106 will cause the voltage to increase over condensor 115 to input $E_1$ of comparator 116 so that an indicating signal $+\alpha$ is generated at its output line 5 for the duration of the voltage increase. The input voltage at $E_1$ of comparator 126 is reduced to correspond to the decrease in voltage in output line 107. Just prior to the generation of the zero signal in output line 107, the input voltage at $E_1$ of comparator 126 will drop below the standing voltage at input $E_2$ whereupon indicating signal $-\omega$ in output line 131 is stopped.

It is thus seen that the comparators 110 and 126 generate indicating signals responsive to the angular velocity of a vehicle as it moves about a vertical axis in one direction or the other. Comparators 116 and 134 generate signals indicating increasing or decreasing angular acceleration of a vehicle as it moves along curved paths.

By means of the potentiometers 113 and 129, the sensitivity of the measuring apparatus in response to the rotational movement of the vehicle indicated by signals $+\omega$ and $-\omega$ can be adjusted. The potentiometers 121 and 139 may be employed for adjusting the response of the measuring apparatus to angular acceleration of the vehicle indicated by signals $+\alpha$ and $-\alpha$.

The feature of adjustability of the sensitivity of response of the measuring apparatus to movement of the vehicle is particularly important since railway vehicles undergo many movements and vibrations even when travelling along a straight track. For example, as vehicles travel along a straight track they undergo a side to side movement which is in the form of a sine curve. It is desired that such movements of the vehicle in the sine curve should not generate any indicating signals. Thus adjusting the sensitivities of response will prevent the generation of indicating signals in the comparators 110, 116, 126 and 134 from small voltage differences in the output lines 106 and 107. In addition, the condensors 115 and 132 can be selected to have such a value that small voltage differences in the output lines 106 and 107 will not produce sufficient voltages in leads 117 and 133 to overcome the standing voltages being introduced at inputs $E_2$ of comparators 116 and 134. The resistors 120 and 135 can be so selected that together with their respective condensors 115 and 132 they will have a time constant of about 3 seconds. Thus, the output signals in response to the gyroscope actuate the comparators as a function of $\Delta t$ and not as the derivative of $t$.

As the vehicle travels along a curved path there is generated in output lines 106 and 107 a useful signal representing voltage changes of a frequency up to 0.1 Herz of a greater amplitude than the already mentioned interfering signals produced from the sine wave motion of the vehicle along a straight track with frequency changes from about 1 Herz with a smaller amplitude. As a result of their high frequency the interfering signals arrive from the output lines 106 and 107 over condensors 115 and 132 to leads 117 and 133 with nearly their entire but smaller absolute amplitude by adjusting of the potentiometers 121 and 139 the input threshold for the comparators 116 and 134 will however be higher than the arriving voltage changes in lines 117 and 133 because of the interfering signals. The interfering signals are unable to generate any indicating signals $+\alpha$ or $-\alpha$ in output lines 5 and 6. The time constants of the time delay circuits 115, 120 and 132, 135 are so selected that the low frequency but generally high amplitude useful signals arising in output lines 106 and 107 from curvilinear travel of the vehicle will be transmitted in sufficient strength to the leads 117 and 133, however on the other hand with this time constant increasing delay times from the appearance of the useful signal until its entry to the comparators 116 and 134 and thus to the release of the indicating signals $+\alpha$ and $-\alpha$ must remain as small as possible.

For more reliable operation of the system it is desirable to stabilize the voltage in line 105 in a manner which is known in the art and has not been described in detail. Furthermore, it is desirable to construct the comparators 110, 116, 126 and 134 in an integrated switchboard.

When the vehicle travels at a slow speed and there is a corresponding low voltage in lead 14, switch 18 in switching device 15 will be open. The voltage supply lead 17 is then without voltage and measuring device 2, pendulum 27 and control switch 32 cannot transmit any signals into their outputs 3–6, 30, 31 and 33. The AND and OR circuits 19, 20, 22, 23, 38 and 39 are thus unable to generate any signals so that relays 47, 48 and 49 and similarly relays 64 and 65 will remain un-energized and no actuating signals will be generated at the outputs 53, 56, 60, 66 and 67.

As the speed of the vehicle increases above a certain predetermined velocity, D.C. generator 13 will produce a voltage which will be sufficient to close switch 18 which thereby connects voltage supply lead 17 to the voltage source 16 and electrical energy is delivered to the components connected to this lead. During movement of the vehicle in the forward direction, switching device 7, under the influence of the corresponding polarity of the voltage produced by D.C. generator 13, will keep the leads 3 and 8, 4 and 9, 5 and 10 and also 6 and 11 connected with each other. During straight line or rectilinear travel of the vehicle no forces will be exerted on the gyroscope 1 and measuring device 2 will not deliver any signals to conductors 3–6. During such rectilinear travel pendulum 27 will remain in its mid or stationary position. Contacts 28 and 29 will remain open and there will be no voltage in leads 30 and 31. The vehicle body will be in a position parallel to the plane of the road bed so that central switch 32 will not transmit any voltage through conductor 33. As a result, no signals will be transmitted to the inputs of AND circuits 19, 20, 22 and 23 and the OR circuits 38 and 39. Relay switches 50, 54 and 58 and also 55 and 59 will keep the outputs 53, 56, 60, 66 and 67 disconnected from the voltage source 31 and no actuating signals will be delivered from the system.

Figure 6:
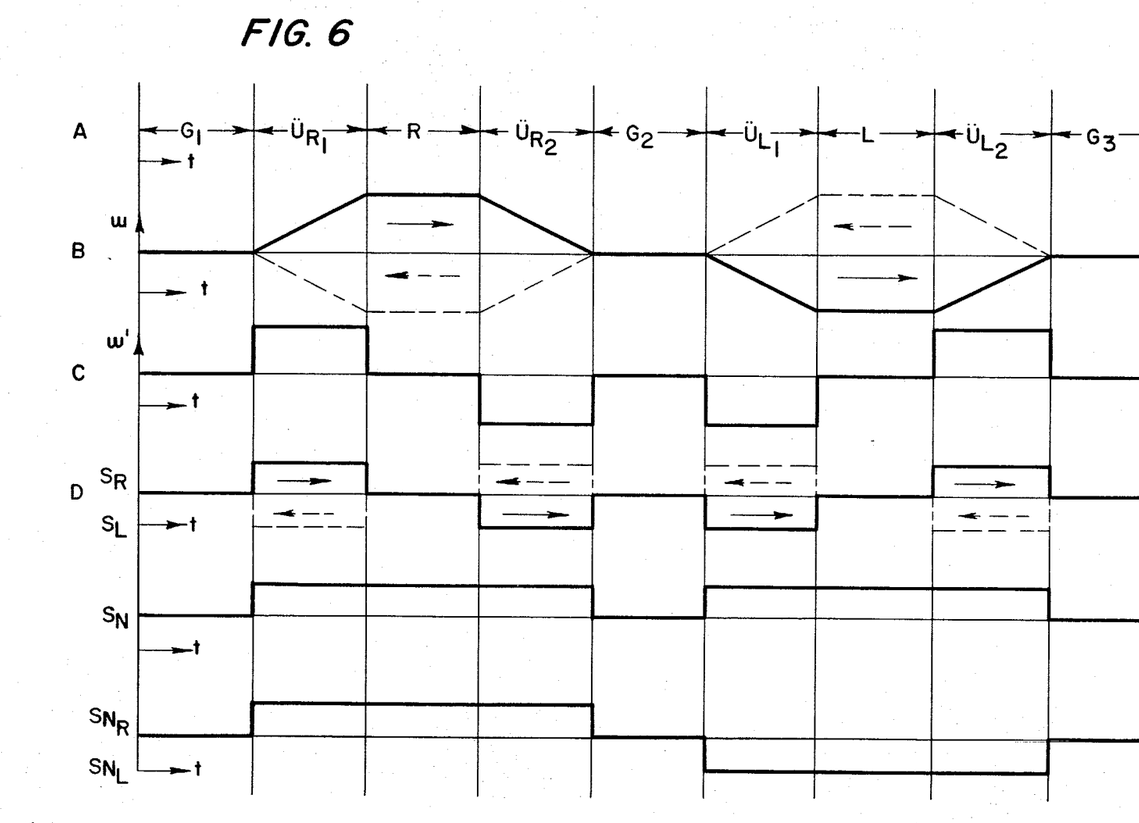
FIG. 6 is a diagram showing graphically the functions of the control system of this invention.

In FIG. 6 there is indicated in row A a portion of the road or path travelled by the vehicle with straight portions of the path being indicated at $G_1$, $G_2$ and $G_3$. Row B will indicate that no measuring signal $\omega$ will appear in leads 3 and 4 to indicate a turning of the vehicle about its vertical axis or an angular velocity. Row C also shows that the measuring device 2 will not transmit any signal $\alpha$ to conductors 5 and 6 to indicate an angular acceleration of the vehicle. Row D shows that no actuating signals will be delivered from the control system while the vehicle travels along these straight portions of the path.

In FIG. 6, row A indicates that between the straight portions as described above the vehicle will travel during the time $t$ a right hand curve having a transition portion $U_{R1}$ at the entrance to the curve and a transitional portion $U_{R2}$ as the vehicle leaves the curve. Between these two transitional portions of the curve there is a constant radius portion indicated at R. After proceeding along the straight portion $G_2$ the vehicle enters a left hand curve having a transition portion $U_{L1}$, a constant radius portion L and an exit transition portion $U_{L2}$. As the vehicle proceeds along the path from $G_1$ to $G_3$ it is considered to be moving in the forward direction.

As the vehicle leaves straight portion $G_1$ to enter the transition curve portion $U_{R1}$ the front end of the vehicle will experience an angular acceleration to the right and also an angular velocity or movement to the right. Gyroscope 1 will thus transmit control signals to measuring device 2 which in turn will generate indicating signals $+\omega$ and $+\alpha$ into conductors 3 and 5 respectively. At the same time, pendulum 27 will swing to the left and close contact 28 to connect the lead 30 with the voltage supply lead 17. The leads 8, 10 and 30 will each transmit a signal to the three inputs of AND circuit 19 and AND circuit 19 in turn will transmit a signal at its output 34. None of the other AND circuits 20, 22 and 23 will receive any input signals and hence will not transmit any output signals.

The OR circuit 38 will then receive an input signal from lead 32 and will transmit a signal through its output 40 to the amplifier 41 so as to energize the coil or relay 48. The relay switches 54 and 55 will thus be closed and output 56 will be connected with the voltage source 51 and will transmit an actuating signal $S_R$. At the same time, the signal $+\omega$ which was fed by measuring device 2 into lead 3 will be transmitted through the output lead 8, across diode 21 and through conductor 25 to the signal amplifier 26 to transmit the amplified signal to relay 47 which will be energized to close the switch 50. This will connect the output lead to the voltage source 51 and an actuating signal $S_N$ will be transmitted through lead 70 to contact 68 and 69 of relay 64 and 65.

Also with the closing of relay switch 55 lead 57 will be connected to the voltage source 51 and the same voltage will be transmitted across the closed contact 62 of relay 64 to output lead 66 which will receive an actuating signal $S_{NR}$. The coil of relay 65 will be energized to open contact 63 while contact 68 will be closed. The output 66 in parallel with contact 62 will thereby be connected through contact 68, the leads 70 and relay switch 50 to voltage source 51.

As described above, a vehicle having an air cushion suspension system and a curvature responsive tilt control system may have its level regulator controlled by the actuating signals $S_N$ so that the heights of the air cushion bellows are kept constant. The actuating signal $S_R$ can effect a pumping of the air from the bellows on the right side of the vehicle into the bellows on the left side of the vehicle to gradually tilt the vehicle body to the right during the duration of actuating signal $S_R$. The actuating signal $S_{NR}$ which is responsive only to the height of the longitudinal tilting axis of the vehicle can effect a connection between the third level regulator and the air cushion bellows on the left side of the vehicle.

At the end of the transition portion $U_{R1}$ the vehicle will reach its maximum angular velocity for the right hand curve. As the vehicle enters the constant radius portion R, the angular acceleration will drop to zero while the angular velocity remains constant. The measuring device 2 will therefore continue to transmit the indicating signal $+\omega$ into conductor 3 to indicate a right hand turning of the vehicle body while the signal $+\alpha$ which was previously transmitted into the lead 5 will cease. The AND circuit 19 will become blocked so that no signal will be transmitted to the inputs of OR circuit 38. The OR circuit will likewise be blocked so that there will not be any output signal at its output 40 and no signal will be transmitted to relay 48 through amplifier 41. The relay switches 54 and 55 will be opened and will disconnect the output lead 56 from the voltage source 51. The output signal $S_R$ will then stop and further tilting of the vehicle body on the air cushion will be discontinued and the present angle of inclination of the vehicle body will be maintained. The output lead 53 and also the output lead 66 will remain connected with voltage source 51 and relay 65 will remain energized. The actuating signals $S_N$ and $S_{NR}$ will therefore continue as the vehicle travels along the constant radius portion of the curve R as shown in FIG. 2. The third level regulator can now regulate the height of the air cushion bellows on the side of the vehicle at the outside of the curve.

When the vehicle travels from the constant radius portion R into the transition portion $U_{R2}$ at the exit of the curve, the vehicle will experience an angular acceleration in the opposite direction from the angular acceleration experienced at the entrance to the curve. This negative or decreasing angular acceleration will in turn decrease the angular velocity of the vehicle. The gyroscope 1 will then transmit a control signal to the measuring device 2 which in turn will transmit a signal $+\omega$ into conductor 3 and a signal $-\alpha$ into the lead 6. AND circuit 20 will thus receive a signal at each of its three inputs and will transmit an output signal at 36. The OR circuit 39 will now become conductive and through lead 42 and amplifier 43 will energize the coil of relay 49. This will close relay switches 58 and 59 to connect output lead 60 to the voltage source 51 and an actuating signal $S_L$ will be generated at the output 60.

In the air cushion suspension system, the actuating signal $S_L$ will control the delivery of air back from the air cushion bellows at the outside of the curve to the bellows at the inside of the curve. During this time the actuating signals $S_N$ and $S_{NR}$ will continue to be generated.

When the vehicle leaves the exit transition portion $U_{R2}$ and travels into the straight portion $G_2$ the vehicle will no longer experience any angular velocity or angular acceleration. The measuring device 2 will then interrupt the measuring signals $+\omega$ and $-\alpha$ in the leads 3 and 6. AND circuit 20 and the serially connected OR circuit 39 will both become blocked and relay 49 will be de-energized. Relay switches 58 and 59 will now open and will interrupt the connection of the output lead 60 with voltage source 51. This will stop the generation of the actuating signal $S_L$.

At the same time, voltage will be shut off through diode 21, lead 25 and the control input of the signal amplifier 26. Relay 47 will thus become de-energized and relay switch 50 will open. The output lead 53 will be disconnected from voltage source 51 and the actuating signal $S_N$ will be stopped. The relay 65 is thus de-energized and output lead 60 is also disconnected from the voltage source 51. This will stop the generation of the actuating signal $S_{NR}$. In the vehicle air cushion suspension system which is actuated by the control system disclosed as this invention the interruption of the actuating signals $S_L$, $S_N$ and $S_{NR}$ will stop the pumping of the air from the bellows at the outside of the curve to the bellows at the inside of the curve, will disconnect the third level regulator from the air cushion bellows at the outside of the curve, and will reestablish the normal operation of the lateral level regulating devices. If the vehicle body has not yet been brought back to its initial vertical position by this pumping back of the air, this repositioning of the vehicle body can be carried out by the lateral level regulators. During this process, the pendulum 27 will open contact 28 to disconnect lead 30 from the voltage source 16. The central switch 32 will remain to its normal resting position and disconnect lead 33 from the voltage source 16. In this manner, the original conditions of the system are restored.

When the vehicle enters the transition portion $U_{L1}$ entering into the left hand curve, the gyroscope 1 will control measuring device 2 to feed indicating signals $-\omega$ into lead 4 and $-\alpha$ into lead 6. At the same time, pendulum 27 will swing to the right to close contact 29 and thus connect lead 31 with voltage source 16. Signals will thus be transmitted to the three inputs of AND circuit 23 so that the AND circuit will become conductive and will generate an output signal at 37 to the OR circuit 39 which will also become conductive. A signal will thus be generated at output 42 to the amplifier 43 whereby relay 49 will be energized to close the relay switches 58 and 59. The output lead 60 will thus be connected to the voltage source 51 and an actuating signal $S_L$ will be generated which throughout its duration can control the repumping of air from the air cushion bellows on the left side of the vehicle to those on the right side.

At the same time, a voltage will be transmitted over lead 9, diode 24 and lead 25 to the signal amplifier 26 which, through lead 44, will energize relay 47. This will close relay switch 50 and will connect output lead 53 with the voltage source 51. A signal $S_N$ will thus be generated at output 53 which, as described above, can be used rendering inactive the level regulator for the height of the air cushion bellows at the side of the vehicle.

The output 67 will be connected to the voltage source 51 through the closed contact 63 and relay switch 59 and, after exitation of relay 64 and the closure of contact 69 through the lead 70. An actuating signal $S_{NL}$ will thus be generated at output 67 and can be used to connect the air cushion bellows to the central level control of the air cushion suspension system.

The vehicle body will therefore be tilted to the left and the central switch.

As soon as the vehicle reaches its maximum angular velocity and enters the constant radius portion L of the curve, the angular acceleration will drop to zero and measuring device 2 will cease transmitting the signal — $\alpha$ which will remain in the lead 6. AND circuit 23 and the OR circuit 39 will be blocked and relay 49 will be de-energized. Relay switches 58 and 59 will open and disconnect the output lead 60 from the voltage source 51. This will stop generation of actuating signal $S_L$. The output lead 67, however, remains connected through lead 7 and the closed contact 69 to the voltage source. The actuating signals $S_N$ and $S_{NL}$ will thus continue and will maintain a regulation of the pressure in the air cushion bellows on the right side of the vehicle by means of the third level regulator device.

As the vehicle enters the transition portion $U_{L2}$ at the exit of the curve, the vehicle will experience an angular acceleration in the opposite direction from that experienced in the entrance transitional portion. This opposite angular acceleration will decrease the angular velocity of the vehicle. The measuring device 2 will thus continue the signal $-\omega$ in the lead 4 and will transmit to lead 5 $a + \alpha$ signal. The AND circuit 22 and the OR circuit 38 will now become conductive and through the amplifier 41 will energize the relay 48. The relay switches 54 and 55 will close and an actuating signal $S_R$ will be generated in the output lead 56. Actuating signal $S_R$ can control a pumping back of the air from the air cushion bellows on the right side of the vehicle into the vellows on the left side during the duration of this signal. The actuating signals $S_N$ and $S_{NL}$ will continue to be generated and the vehicle will thus be returned gradually into its vertical upright position as it leaves the curve through the transition portion $U_{L2}$.

When the vehicle enters the straight portion $G_3$, the vehicle will no longer experience any angular velocity or angular acceleration. The measuring device 2 will then interrupt signal $-\omega$ in lead 4 and signal $+\alpha$ in lead 5. AND circuit 22 and OR circuit 38 will become blocked, the relay 48 will be de-energized and the relay switches 54 and 55 will open. The output lead 56 will be disconnected from the voltage source 51 and the actuating signal $S_R$ will no longer be transmitted. At the same time, no signal will be delivered from lead 9 over diode 24 and conductor 25 to the input of the amplifier 26 so that relay 47 will be de-energized to open switch 50. The output lead 53 will thus be disconnected from the voltage source 51 and actuating signal $S_N$ will be stopped. Also at the same time, the output lead 67 will be discontinued from voltage source 51, relay 54 will be de-energized and the actuating signal $S_{NL}$ will be stopped. The stopping of actuating signals $S_N$ and $S_{NL}$ can disconnect the air cushion bellows on the right side from the central third level regulator and to render operative again the lateral level regulator devices. During these functions, the pendulum 27 will return to its vertical resting position to open contact 29 and as the vehicle body returns to its upright position central switch 32 will disconnect lead 33 from the voltage source 16.

As the vehicle travels along a curved track, the pendulum 27 will seek a position in the direction of the resultant of the force of gravity and the centrifugal force. When only a slight curve is encountered and the vehicle body is tilted too rapidly by the pumping of air from the air cushion bellows on the inside of the curve to the bellows on the outside of the curve, the pendulum 27 may reach the inclination corresponding to the momentary curvature of the path and the vehicle speed and will open contacts 28 or 29. In this manner AND circuit 19 or 23 will be blocked to stop the generation of actuating signals $S_R$ or $S_L$. The pendulum 27 therefore functions to prevent excessive tilting of the vehicle body while entering a curve.

If the vehicle should be returned to a completely vertical upright position by the pumping of the air from the air cushion on the outside of the curve into the air cushion on the inside of the curve before the vehicle has reached the straight portion of the path, the central switch 32 will interrupt the voltage along lead 33 when the vehicle body moves into a position parallel to the plane of the road. This will block AND circuits 20 or 22 and will stop the generation of the continuously present actuating signals $S_L$ or $S_R$. The pumping of the air will thus be interrupted and the vehicle body will be maintained in its vertical upright position.

Pendulum 27 thus prevents over-control while the vehicle enters a curve and central switch 32 prevents over-control while the vehicle leaves the curve.

Should the vehicle travel along the path indicated in row A of FIG. 6 from the right to the left it will experience the same angular accelerations as while travelling from left to right but the angular velocities will be reversed in directions. The actuating signals $S_R$ and $S_L$ which are generated in the different portions of the path will thus be transposed to tilt the vehicle body toward the inner periphery of the curve. The switching device 7 provides for a corresponding re-setting of the control system. As the vehicle travels in the reverse direction the D.C. generator 13 will produce a voltage of the opposite polarity and through control lead 12 will actuated the switching device 7 to connect lead 3 with lead 9, lead 4 with lead 8, lead 5 with lead 11 and lead 6 with lead 10. The same switching action as described above will be maintained but in the individual transitional portions $U_{L2}$, $U_{L1}$, $U_{R2}$ and $U_{R1}$ the generation of actuating signals $S_R$ and $S_L$ will be reversed. The transposed connections of switching device 7 for reverse travel of the vehicle are indicated in dotted lines in FIG. 4.

In the control system as described above AND and OR circuits are required. However, these circuits can be replaced by Nand circuits so that the same kinds of circuits are used throughout the entire system. Nand circuits have the characteristic of blocking and producing no output signal only during that time when there are input signals to all of the input terminals. It is apparent that with the use of Nand circuits, the functioning of the control system with respect to the transmission of signals in conductors 8, 9, 10 and 11 and also 30, 31 and 33 on the one hand and in relation to the conductors 40 and 42 on the other hand will not be changed.

The present control system can also be used for inclination or tilting control of an air cushion suspension system. The actuating signals generated by the control system can also be used for curvature responsive tilt control of a vehicle equipped with the usual leaf or coil springs by employing special cylinder and piston devices which only control the tilting of the vehicle body. The actuating signals may also be used to control the adjustment of curve control axles or the turning positions of vehicles as well as for curvature controlled vehicle couplings.

Instead of controlling the measuring device 2 by gyroscope 1 the measuring device 2 may also be controlled by a stationary weight rotatable about a vertical axis in the vehicle in response to inertia. This modification however is less sensitive than the use of a gyroscope.

Thus it can be seen that the present invention provides an effective control system which generates actuating signals in response to the curvilinear or rectilinear travel of a vehicle to control the functioning of an air cushion suspension system to tilt the vehicle in the proper direction and to maintain the vehicle at a desired level relationship. The present control system employs different components in the form of AND circuits and OR circuits but can be modified by the use of combined circuits wherein the AND circuits and OR circuits are combined into Nand circuits. Nand circuits have the characteristic of generating an output signal only when one of the input signals is not transmitted to the input thereof. In order to obtain an actuating signal suitable for control purposes it is desirable to connect a signal amplifier after the OR circuit or the Nand circuit before which two Nand circuits are connected.

The air cushion suspension system of a vehicle to which the control system of the present invention is directed is generally provided with a third centrally positioned level regulator to maintain the longitudinal axis of tilt of the vehicle at a constant height. The air cushion bellows of the air cushion suspension system are generally characterized by having volumes which do not increase linearly with their heights. Further, losses of air from the air cushion bellows occur during actuation of the tilting control in response to the curvature of the path. For these reasons, when the vehicle travels along a curve there will occur during the tilting of the vehicle body a lowering of the longitudinal axis about which the vehicle body is tilted. The third level regulator which is switched in when the two lateral level regulators are disconnected will deliver compressed air into only that bellows which is then at the outside of the curve to raise the longitudinal axis of tilt during the tilting of the vehicle body. The actuating signal for this third level control device is generated from a switching system which during the actuation of an actuating signal responsive to the angular acceleration and angular velocity will switch in an actuating signal which is similarly responsive to the angular acceleration and angular velocity but which during that time remains independent of the direction of turning.

It will be understood that this invention is subject to modification in order to adapt it to different uses and conditions and, accordingly, it is desired to comprehend such modification within this invention as may fall within the scope of the appended claims.

What is claimed is:

1. In a curve responsive tilt control device for a railway vehicle having an air cushion suspension system and a measuring device that generates control signals while the vehicle is traveling along a curved path, the combination of a gyroscope mounted in the vehicle with its axis of rotation in a state of rest being horizontal and transverse to the longitudinal axis of the vehicle, a measuring device coupled to said gyroscope and comprising means for delivering signals corresponding to the angular velocity and angular acceleration of the vehicle in response to the magnitude and speed of deflection of the axis of rotation of the gyroscope from its state of rest position during movement of the vehicle along a curved path and a signal modulator connected to said measuring device for delivering actuating signals to control the air cushion suspension whereby the vehicle is tilted in the proper direction depending upon the curvilinear travel of the vehicle.

2. In a curve responsive control device as claimed in claim 1 and comprising switching means connected to said angular acceleration and angular velocity signal generating means and responsive to the forward and rearward direction of movement of the vehicle for transposing said signals to correspond to the direction of travel of the vehicle.

3. In a curve responsive control device as claimed in claim 2 and comprising a D.C. generator drivingly connected to a wheel of the vehicle, said switching means connected to said D.C. generator and responsive to the polarity of the voltage generated therefrom.

4. In a curve responsive control device as claimed in Claim 1 and comprising means responsive to the speed of the vehicle for stopping the generation of said direction actuating signals when the vehicle speed is below a predetermined value.

5. In a curve responsive control device as claimed in Claim 4 and comprising a D.C. generator drivingly connected to a wheel of the vehicle and to said stop signal generating means whereby said stop signal generating means is controlled by said D.C. generator.

6. In a curve responsive control device as claimed in Claim 1 and comprising central switch means on said vehicle responsive to the angle between the plane of the road upon which the vehicle is travelling and the central longitudinal vertical plane of the vehicle.

7. In a curve responsive control device as claimed in Claim 1 and comprising a pendulum swinging in a plane transverse to the direction of travel of the vehicle, and means responsive to the movement of said pendulum for permitting the generation of direction actuating signals only when the angular acceleration and turning movement of the vehicle are in the same direction and the pendulum has swung in the opposite direction.

8. In a curve responsive control device as claimed in Claim 7 and comprising central switch means on said vehicle responsive to the angle between the plane of the road upon which the vehicle is traveling and the central longitudinal vertical plane of the vehicle, a first Nand circuit having inputs connected to said angular acceleration and angular velocity signal generating means and to said pendulum responsive permit signal means, said first Nand circuit receiving only angular acceleration and angular velocity signals in the same direction and only signals from said pendulum when the pendulum has swung in the opposite direction, a second Nand circuit having inputs connected to said angular acceleration and angular velocity signal generating means and to said central switch means, said second Nand circuit receiving only angular acceleration and angular velocity signals in different directions and signals from said switch means indicating deviation of the vehicle from a position perpendicular to the plane of the road, a third Nand circuit having inputs connected to the output of said first and second Nand circuits, the output of said third Nand circuit being the direction actuating signals.

9. In a curve responsive control device as claimed in claim 8 and comprising signal amplifier means connected to the output of said third Nand circuit.

10. In a curve responsive control device as claimed in claim 7 and comprising central switch means on said vehicle responsive to the angle between the plane of the road upon which the vehicle is travelling and the central longitudinal vertical plane of the vehicle, a first pair of AND circuits having inputs connected to said angular acceleration and angular velocity signal generating means and said pendulum responsive permit signal means, said first pair of AND circuits receiving only angular acceleration and angular velocity signals in the same direction and only signals from said pendulum when the pendulum has swung in the opposite direction, a second pair of AND circuits having inputs connected to said angular acceleration and angular velocity signal generating means and to said central switch means, said second pair of AND circuits receiving only angular acceleration and angular velocity signals in different directions and signals from said switch means indicating deviation of the vehicle from a position perpendicular to the plane of the road, a first OR circuit having inputs connected to the outputs of ones of said first and second pairs of AND circuits, a second OR circuit having inputs connected to the outputs of the others of said first and second pairs of AND circuits, the output signal of said OR circuits comprising the direction actuating signals.

11. In a curve responsive control device as claimed in claim 10 and comprising signal amplifier means connected to the outputs of said first and second OR circuits.

12. In a curve responsive control device as claimed in claim 11 and comprising a pair of diodes connected between said angular acceleration and angular velocity signal generating means and the input of a signal amplifier means, the diodes receiving those signals indicating different turning movements of the vehicle, the output of said signal amplifier means being an actuating signal independent of vehicle direction.

13. In a curve responsive control device as claimed in claim 12 and comprising means responsive to a direction actuating signal for generating a second direction actuating signal and for continuing the generation of said second direction actuating signal while said actuating signal independent of vehicle direction is being generated.

14. In a curve responsive control device as claimed in Claim 13 wherein said second direction actuating signal generating means comprises first and second relays with each relay having a closed contact and an open contact when said relay is non-energized, a first and second output conductor for said second direction actuating signals with each conductor connected across the open contact of one relay and the closed contact of the other relay, first and second relay switches connected to a voltage source and to the contacts closed during generation of a direction actuating signal, and a conductor connected to the open contacts to transmit the actuating signal independent of vehicle direction.

15. In a curve responsive control device as claimed in Claim 1 and comprising an output line from said measuring apparatus to transmit an output signal proportional to the angular velocity of the vehicle, amplifier means connected to said output line, a first comparator having first and second inputs and an output with said first input connected to said amplifier means, time delay means including a condensor and a resistor also connected to said output line, a second comparator having first and second inputs and an output with said first input connected to said time delay means, means connected to the second inputs of said first and second comparators for introducing a predetermined voltage thereto, the output of the first comparator generating an indicator signal responsive to the angular velocity of the vehicle and the output of the second comparator generating an indicator signal responsive to the angular acceleration of the vehicle.

16. In a curve responsive control device as claimed in Claim 15 with first and second output lines from said measuring apparatus to transmit respective output signals having mirror image amplitudes proportional to the angular velocity of the vehicle to a zero-signal, amplifier means including a transistor and a resistor connected to each output line, first comparator means connected to said amplifier means, a condensor connected to each of said output lines and second comparator means connected to each of said condensors.

17. In a curve responsive control device as claimed in Claim 15 wherein the time constant of the time delay means is 3 seconds.

18. In a curve responsive control device as claimed in Claim 15 wherein said output amplifier means comprises a transistor and a resistor connected as an emitter-follower.

19. In a curve responsive control device as claimed in Claim 15 wherein said predetermined voltage introducing means comprises a potentiometer.

* * * * *